United States Patent
Fakhry

(10) Patent No.: US 12,035,004 B2
(45) Date of Patent: *Jul. 9, 2024

(54) VISUAL TESTING BASED ON MACHINE LEARNING AND AUTOMATED WORKFLOW

(71) Applicant: DISH Network L.L.C., Englewood, CO (US)

(72) Inventor: Andrew Fakhry, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,410

(22) Filed: Jul. 12, 2023

(65) Prior Publication Data

US 2023/0362439 A1    Nov. 9, 2023

Related U.S. Application Data

(63) Continuation of application No. 17/070,186, filed on Oct. 14, 2020, now Pat. No. 11,792,482.

(51) Int. Cl.
| | |
|---|---|
| *H04N 21/4425* | (2011.01) |
| *G06N 3/02* | (2006.01) |
| *G06N 20/00* | (2019.01) |
| *H04N 21/442* | (2011.01) |

(52) U.S. Cl.
CPC ..... *H04N 21/4425* (2013.01); *H04N 21/4424* (2013.01); *G06N 3/02* (2013.01); *G06N 20/00* (2019.01)

(58) Field of Classification Search
CPC .......... H04N 21/4425; H04N 21/4424; G06N 20/00; G06N 3/02
See application file for complete search history.

(56) References Cited

U.S. PATENT DOCUMENTS

| | | |
|---|---|---|
| 6,708,324 B1 | 3/2004 | Solloway et al. |
| 6,775,824 B1 | 8/2004 | Osborne, II et al. |
| 6,993,747 B1 | 1/2006 | Friedman |
| 7,000,224 B1 | 2/2006 | Osborne, II et al. |
| 7,228,524 B2 | 6/2007 | Bailey et al. |
| 7,313,564 B2 | 12/2007 | Melamed et al. |
| 8,020,044 B2 | 9/2011 | Martinov |
| 8,086,902 B2 | 12/2011 | Rashevsky et al. |

(Continued)

FOREIGN PATENT DOCUMENTS

| | | | |
|---|---|---|---|
| EP | 3273689 A1 | * | 1/2018 |
| EP | 3273689 A1 | | 1/2018 |
| JP | 2008206042 A | | 9/2008 |

OTHER PUBLICATIONS

Office Action, dated Oct. 6, 2023, for U.S. Appl. No. 17/329,933. (31 pages).

*Primary Examiner* — James R Sheleheda

(74) *Attorney, Agent, or Firm* — Seed IP Law Group LLP

(57) ABSTRACT

An example method for visual testing of programmed display of content includes obtaining a workflow of test scenarios for visual testing of a display controlled by a set-top box (STB) device. The method also includes obtaining images that capture content displayed on the display, feeding the images to a trained machine learning model to detect display elements, and performing visual testing based on the detected display elements in accordance with visual expectations specified by the test scenarios.

20 Claims, 6 Drawing Sheets

(56) References Cited

U.S. PATENT DOCUMENTS

| | | |
|---|---|---|
| 8,195,983 B2 | 6/2012 | Celeskey et al. |
| 8,856,594 B2 | 10/2014 | Kurapati et al. |
| 9,003,368 B2 | 4/2015 | Kim et al. |
| 9,032,373 B1 | 5/2015 | Gupta et al. |
| 9,135,146 B1 | 9/2015 | Allen et al. |
| 9,378,120 B2 | 6/2016 | Chakraborty et al. |
| 9,430,359 B1 | 8/2016 | Troutman et al. |
| 9,510,044 B1 | 11/2016 | Pereira et al. |
| 9,600,401 B1 | 3/2017 | Haischt et al. |
| 9,774,912 B2 | 9/2017 | Friel et al. |
| 10,291,959 B2 | 5/2019 | Kumar et al. |
| 10,528,691 B1* | 1/2020 | Ovadia ............... G06F 30/3308 |
| 10,574,980 B1 | 2/2020 | Batiz et al. |
| 10,592,703 B1* | 3/2020 | Ovadia ............... G06F 30/3312 |
| 11,144,693 B1* | 10/2021 | Ovadia .................... G06F 30/31 |
| 11,521,400 B2 | 12/2022 | Chhabra et al. |
| 11,792,482 B2* | 10/2023 | Fakhry ............... H04N 21/4425 |
| | | 725/132 |
| 2006/0010426 A1 | 1/2006 | Lewis et al. |
| 2006/0075303 A1 | 4/2006 | Ulrich et al. |
| 2006/0195860 A1 | 8/2006 | Eldering et al. |
| 2007/0094542 A1 | 4/2007 | Bartucca et al. |
| 2007/0157274 A1 | 7/2007 | Chiu |
| 2007/0277158 A1 | 11/2007 | Li et al. |
| 2008/0127097 A1 | 5/2008 | Zhao et al. |
| 2008/0256394 A1* | 10/2008 | Rashevsky .......... G06F 11/3616 |
| | | 714/38.1 |
| 2009/0133000 A1 | 5/2009 | Sweis et al. |
| 2009/0178021 A1 | 7/2009 | Alluri |
| 2010/0324855 A1 | 12/2010 | Parker |
| 2011/0276946 A1 | 11/2011 | Pletter |
| 2011/0289354 A1* | 11/2011 | Martinov ............ G06F 11/3688 |
| | | 714/E11.178 |
| 2011/0307864 A1 | 12/2011 | Grechanik et al. |
| 2012/0023485 A1 | 1/2012 | Dubey et al. |
| 2012/0110591 A1 | 5/2012 | Ghosh et al. |
| 2012/0226462 A1 | 9/2012 | Rucker |
| 2013/0007522 A1 | 1/2013 | Kurapati et al. |
| 2013/0159784 A1 | 6/2013 | Rossi |
| 2014/0325487 A1 | 10/2014 | Maczuba |
| 2015/0070587 A1 | 3/2015 | Emeott et al. |
| 2015/0212927 A1 | 7/2015 | N'Gum et al. |
| 2016/0378647 A1 | 12/2016 | Maeoka et al. |
| 2017/0147480 A1 | 5/2017 | Lachwani et al. |
| 2017/0286805 A1 | 10/2017 | Yu et al. |
| 2018/0307583 A1 | 10/2018 | Yang et al. |
| 2019/0045203 A1* | 2/2019 | Varadarajan ........... H04N 19/42 |
| 2019/0163612 A1 | 5/2019 | Michalski |
| 2019/0243752 A1 | 8/2019 | Bakshi et al. |
| 2020/0249964 A1 | 8/2020 | Fernandes et al. |
| 2021/0014565 A1 | 1/2021 | Zamudio et al. |
| 2021/0216442 A1 | 7/2021 | Bhadani |
| 2021/0397546 A1 | 12/2021 | Cser et al. |
| 2022/0100647 A1 | 3/2022 | Hamid |
| 2022/0116680 A1 | 4/2022 | Fakhry |
| 2022/0237500 A1* | 7/2022 | Dinh ........................ G06N 5/01 |
| 2022/0382667 A1* | 12/2022 | Rishea ................ G06F 11/3664 |

\* cited by examiner

```
Given <STB1> is {Running}
When press {Menu, 6, 4}
Then
<title> is {On Demand Purchase History}
<logo> is {dish}
<time> is {True}
<description> is {No events are currently found on the system}
<info-box> is {True}
<tv-screen> is {True}
<screen-button-1> is {Done}
<screen-button-2> is {Cancel}
```

*Fig. 4A*

VISUAL TESTING BASED ON MACHINE LEARNING AND AUTOMATED WORKFLOW

BACKGROUND

Technical Field

The present disclosure relates to visual testing of content presentation, and in particular to visual testing of the functionality of a software or application independent of its internal structure or design.

Description of the Related Art

Content distribution platforms, such as satellite television service providers and cable television service providers, interact with large numbers of hardware devices associated with their respective consumer subscribers. As one example, a platform may provide multimedia programming to hundreds of thousands, or even millions, of set-top boxes ("STBs" or "STB devices").

Black box visual testing independent of the underlying design or code executing on the STBs is an important step to verify the integrity of their functionality. Typical black box testing relies heavily on manual tagging of displayed features by testers, thus can be a lengthy and repetitive process that goes back and forth between developers and testers. Additionally, comprehensive black box testing in typical settings cannot even get started until proposed code changes are reviewed and approved, yet developers still need to spend time verifying the changes manually prior to the testing. Thus, there remains a need for more efficient and effective visual testing technologies.

BRIEF DESCRIPTION OF THE DRAWINGS

FIG. 4A shows an example of a test scenario in accordance with some embodiments of the techniques described herein.

DETAILED DESCRIPTION

Figure 1:
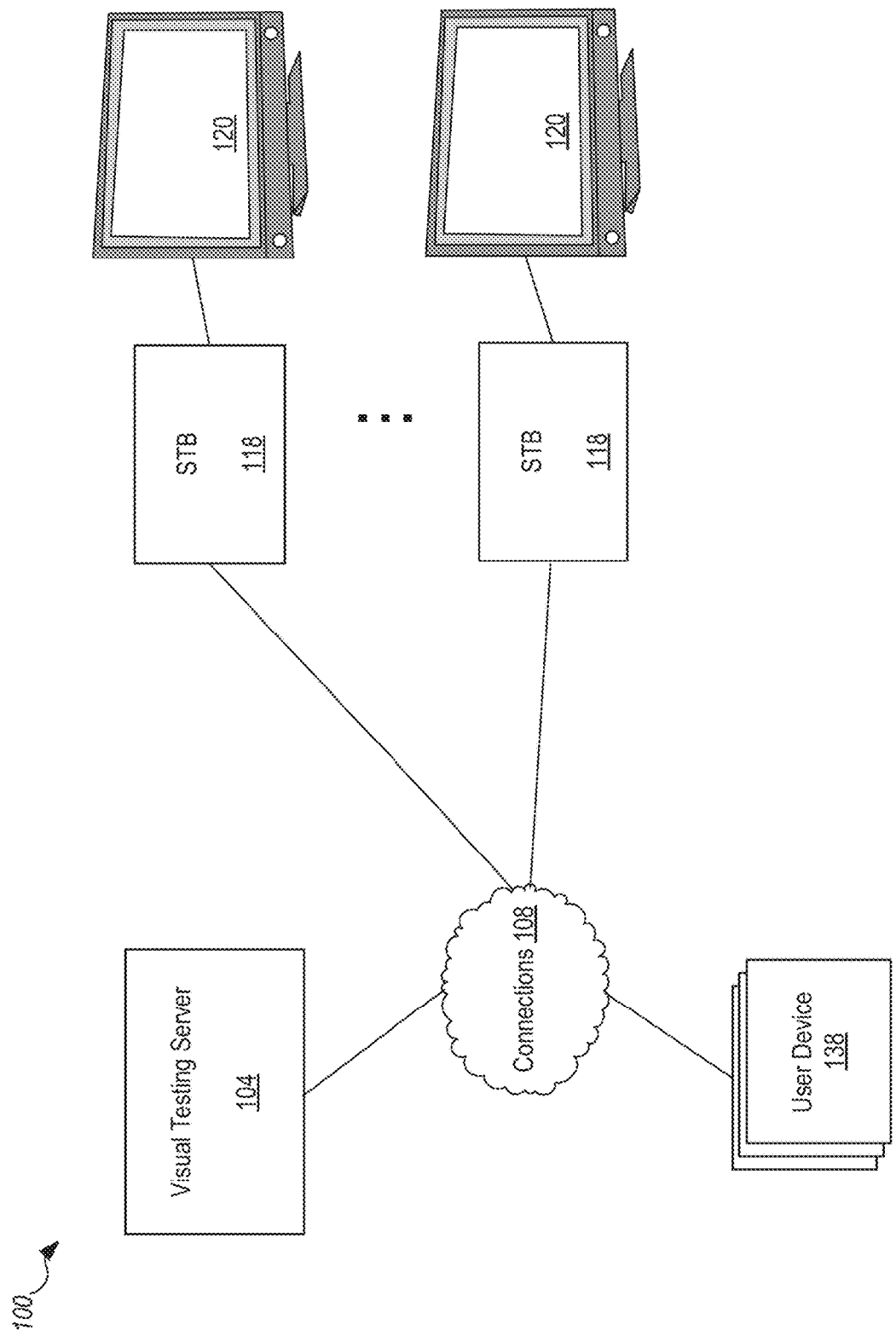
FIG. 1 is an overview block diagram illustrating an exemplary networked environment for visual testing in accordance with some embodiments of the techniques described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is comprised. For instance, a subset of a set of ten items will have less than ten items and at least one item.

The presently disclosed technology enables a user (e.g., a tester, developer, or third party) to prepare one or more test scenarios as soon as a functional design (e.g., a story to be programmed) is created. Test scenarios can be integrated in one or more workflows for automated execution during or after the development of hardware and/or software. The presently disclosed technology uses trained machine learning model(s) to detect screen elements with high efficiency and consistency in testing results, which further improves the adaptability to and compatibility among different testing targets.

In certain embodiments of the presently disclosed technology, a visual testing server obtains a workflow of test scenarios for visual testing of an STB controlled display (e.g., TV, monitor, projector, or the like). A test scenario can be represented by logical expression(s) that specify condition(s), action(s), expectation(s), or the like. The visual testing server communicates (e.g., via Representational State Transfer Application Programming Interfaces (REST APIs)) with the STB under testing when the specified condition (e.g., the STB is warmed up and running) is satisfied, to perform or simulate action(s) applicable to the STB (e.g., remote control key press), and then obtains (e.g., by requesting screenshots via a server or application running on the STB) image(s) that capture content displayed on the STB display in response.

The visual testing server feeds the image(s) to a trained machine learning model to identify and locate display elements, and performs visual testing by comparing various information about the detected display elements with one or more visual expectations specified by the test scenario. Using the machine learning model, the visual testing server can determine the classification, location, size, color, or content of detected display elements, as well as confidence values associated therewith. The visual expectations can indicate expected location of a display element relative to at least another display element, expected location of a display element relative to the STB display, expected range of display element location, or expected distance between at least two display elements. The visual expectations can indicate expected size of a display element relative to at least another display element, expected size of a display element relative to the STB display, or expected range of display element size. Depending on the outcome of the testing (e.g., using thresholds applicable to the associated confidence values), the visual testing server can proceed to another test scenario selected from the workflow (e.g., in a temporally sequential, concurrent, or partially overlapping manner).

In various embodiments, the presently disclosed technology may provide various functionality to enable presentation of one or more aspects of workflow obtaining, workflow processing, display element detection, or the like. As non-limiting examples, in various embodiments such functionality may include one or more of the following: providing a user interface—such as a command-line query interface, a GUI, or application program interface (API)— to allow one or more users to interact with the visual testing server.

FIG. 1 is an overview block diagram illustrating an exemplary networked environment 100 that includes a visual testing server 104, one or more STB devices 118 and their associated display devices 120, and one or more user devices 138, which are interconnected with one another via at least some part of connections 108. For purposes of clarity, the exemplary networked environment 100 includes a single visual testing server 104; it will be appreciated that in various scenarios and embodiments, multiple such entities or functional equivalents may be communicatively connected with other entities of environment 100.

In various embodiments, examples of an STB device 118 include, but are not limited to, one or a combination of the following: a "television converter," "receiver," "set-top box," "television receiving device," "television receiver," "television," "television recording device," "satellite set-top box," "satellite receiver," "cable set-top box," "cable receiver," "media player," "digital video recorder (DVR)," "digital versatile disk (DVD) Player," "computer," "mobile device," "tablet computer," "smart phone," "MP3 Player," "handheld computer," and/or "television tuner," etc. Accordingly, the STB device 118 may be any suitable converter device or electronic equipment that is, e.g., operable to receive programming via a connection to a satellite or cable television service provider and communicate that programming to another device over a network. Further, the STB device 118 may itself include user interface devices, such as buttons or switches.

In various embodiments, examples of a display device 120 may include, but are not limited to, one or a combination of the following: a television ("TV"), a projector, a monitor, a personal computer ("PC"), a sound system receiver, a digital video recorder ("DVR"), a compact disk ("CD") device, DVD Player, game system, tablet device, smart phone, mobile device or other computing device or media player, and the like. Each of the display devices 120 typically employs a display, one or more speakers, or other output devices to present at least image(s), video, and/or audio to a user. In many implementations, one or more display devices 120 are communicatively coupled, directly or indirectly, to an STB device 118. Further, the STB device 118 and the display device(s) 120 may be integrated into a single device. Such a single device may have the above-described functionality of the STB device 118 and the display device 120, or may even have additional functionality.

In some embodiments, the STB device(s) 118 is configured to receive and decrypt content received according to various digital rights management and other access control technologies and architectures by executing computer codes or other executable instructions. Furthermore, in at least some embodiments, the STB device(s) 118 may include one or more APIs that provide programmatic access to add, remove, or change one or more functions of the STB device(s) 118. For example, such an API may provide a programmatic interface to one or more functions that may be invoked by any other program, a remote control, one or more content providers and/or program distributors, one or more information providers, a local and/or remote content storage system, or some other module. In this manner, the API may facilitate the development of third-party software, such as various different on-demand service applications, user interfaces, plug-ins, adapters (e.g., for integrating functions of the STB device 118 into desktop applications), and other functionality. In particular, one or more APIs (e.g., REST APIs) provide a programmatic interface to a server or application executing on the STB device 118 that communicates with the visual testing server 104 to perform visual testing of STB native functions or third-party software, independent of their executable code or instructions.

In the depicted exemplary networked environment 100, the connections 108 may comprise one or more computer networks, one or more wired or wireless networks, satellite transmission media, one or more cellular networks, or some combination thereof. The connections 108 may include a publicly accessible network of linked networks, possibly operated by various distinct parties, such as the Internet. The connections 108 may include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the connections 108 may include various types of wired and/or wireless networks in various situations, including satellite transmission. In addition, the connections 108 may include one or more communication interfaces to individual entities in the networked environment 100, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, examples of a user device 138 include, but are not limited to, one or a combination of the following: a "computer," "mobile device," "tablet computer," "smart phone," "handheld computer," and/or "workstation," etc. The user device(s) 138 may be any suitable computing device or electronic equipment that is, e.g., operable to communicate with the visual testing server 104 and to interact with user(s) for obtaining and processing test scenario(s) or workflow(s) as well as presenting visual testing progress(es) or result(s).

In various embodiments, the visual testing server 104 can be implemented in software and/or hardware form on one or more computing devices including a "computer," "mobile device," "tablet computer," "smart phone," "handheld computer," and/or "workstation," etc. The interactions of the visual testing server 104 with the STB device(s) 118 and the user device(s) 138 may occur in various ways, such as in an interactive manner via a GUI (e.g., in the form of Web pages) that is provided by the visual testing server 104 to users through associated user devices 138. Information may also be provided in a programmatic manner by one or more software applications via API(s).

Data communications among entities of the networked environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the exemplary networked environment 100 and the various service providers, systems, networks, and devices therein is intended as a broad, non-limiting overview of an exemplary environment in which various embodiments of the facility may be implemented. FIG. 1 illustrates just one example of an operating environment, and the various embodiments discussed herein are not limited to such environments. In particular, the networked environment 100 may contain other devices, systems and/or media not specifically described herein.

Figure 2:
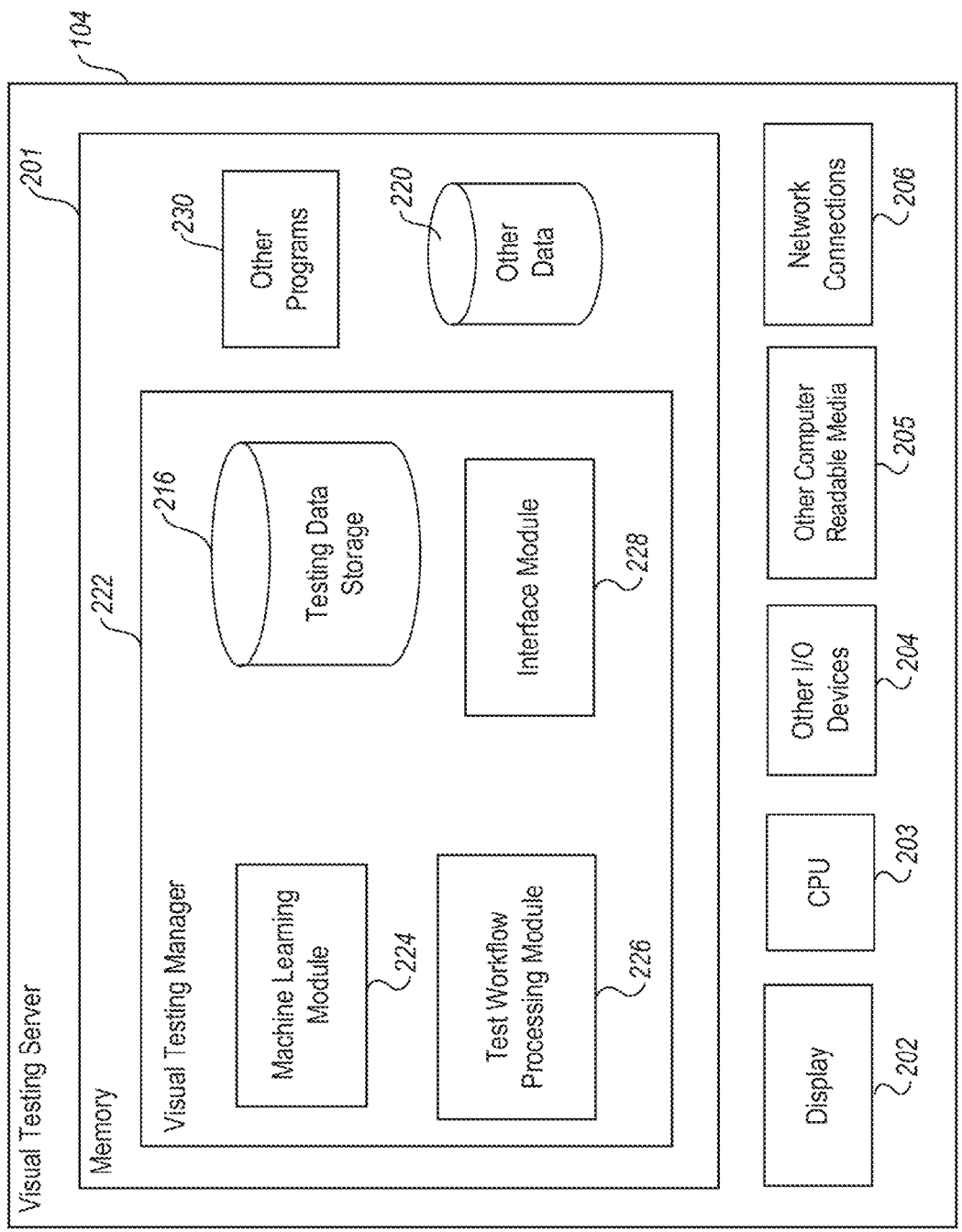
FIG. 2 is a block diagram illustrating elements of an exemplary visual testing server utilized in accordance with some embodiments of the techniques described herein.

FIG. 2 is a block diagram illustrating elements of an exemplary visual testing server 104 that is suitable for performing at least some of the techniques described herein, according to some embodiments.

In some embodiments, one or more general purpose or special purpose computing systems or devices may be used to implement the visual testing server 104. In addition, in some embodiments, the visual testing server 104 may comprise one or more distinct computing systems or devices, and may span distributed locations. Furthermore, each block shown in FIG. 2 may represent one or more such blocks as appropriate to a specific embodiment or may be combined with other blocks. Also, the visual testing manager 222 may be implemented in software, hardware, firmware, or in some combination to achieve the capabilities described herein.

In the embodiment shown, the visual testing server 104 comprises a computer memory ("memory") 201, a display 202 (including, but not limited to a light emitting diode (LED) panel, cathode ray tube (CRT) display, liquid crystal display (LCD), touch screen display, projector, etc.), one or more Central Processing Units ("CPU") 203, Input/Output ("I/O") devices 204 (e.g., keyboard, mouse, RF or infrared receiver, universal serial bus (USB) ports, High-Definition Multimedia Interface (HDMI) ports, other communication ports, and the like), other computer-readable media 205, and network connections 206. The visual testing manager 222 is shown residing in memory 201. In other embodiments, some portion of the contents and some, or all, of the components of the visual testing manager 222 may be stored on and/or transmitted over the other computer-readable media 205. The components of the visual testing server 104 and visual testing manager 222 can execute on one or more CPUs 203 and implement the processing of test scenario(s) and test workflow(s), detecting display elements based on machine learning model(s), and/or other functions described herein. In some embodiments, the visual testing manager 222 may operate as, be part of, or work in conjunction and/or cooperation with other software applications stored in memory 201 or on various other computing devices. In some embodiments, the visual testing manager 222 also facilitates communication with peripheral devices such as a remote control, via the I/O devices 204, or with another device or system (e.g., an STB device) via the network connections 206.

The machine learning module 224 is configured to perform actions related to machine learning-based display element processing. In some embodiments, the machine learning module 224 is configured to perform model selection, model training, model validation, model deployment, model error detection, model updating, model-based display element detection, combinations of the same or the like. In some embodiments, the machine learning module 224 stores, retrieves, or otherwise accesses at least some model-related data on some portion of the testing data storage 216 or other data storage internal or external to the visual testing server 104.

The test workflow processing module 226 is configured to perform actions related to test scenario and test workflow processing. In some embodiments, the test workflow processing module 226 is configured to perform test scenario in-taking, test workflow integration, test scenario/workflow parsing, causing and controlling communication with STB device(s) under testing, obtaining image/video used for visual testing, combination of the same or the like. In some embodiments, the test workflow module 226 stores, retrieves, or otherwise accesses at least some test-related data on some portion of the testing data storage 216 or other data storage internal or external to the visual testing server 104.

The interface module 228 is configured to perform actions related to facilitating interactions with user device(s) 138. In some embodiments, the interface module 228 is configured to perform GUI generation, GUI processing, user input processing, presentation of test process and result, combination of the same or the like. In some embodiments, the interface module 228 stores, retrieves, or otherwise accesses at least some user interface-related data on some portion of the testing data storage 216 or other data storage internal or external to the visual testing server 104.

Other code or programs 230 (e.g., further audio/video processing modules, a program guide manager module, a Web server, and the like), and potentially other data repositories, such as data repository 220 for storing other data (user profiles, preferences and configuration data, etc.), may also reside in the memory 201, and can execute on one or more CPUs 203. Of note, one or more of the components in FIG. 2 may or may not be present in any specific implementation. For example, some embodiments may not provide other computer readable media 205 or a display 202.

In some embodiments, the visual testing server 104 and manager 222 include API(s) that provides programmatic access to add, remove, or change one or more functions of the visual testing server 104. One or more APIs (e.g., REST APIs) can provide programmatic interface to allow STB device(s) or user device(s) to communicate with the visual testing server 104, for performing visual testing of the STB device(s).

In some embodiments, components/modules of the visual testing server 104 and manager 222 are implemented using standard programming techniques. For example, the visual testing manager 222 may be implemented as an executable running on the CPU 203, along with one or more static or dynamic libraries. In other embodiments, the visual testing server 118 and manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C #, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the visual testing server 104 to perform the functions of the visual testing manager 222. In some embodiments, instructions cause the CPU 203 or some other processor, such as an I/O controller/processor, to perform at least some functions described herein including, but are not limited to, test scenario processing, test workflow processing, machine learning based display item detection, or the like.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs or other processors. Some embodiments may execute concurrently and asynchronously, and communicate using message passing techniques. Equivalent synchronous embodiments are also supported by a visual testing manager 222 implementation. Also, other functions could be implemented and/or performed by each component/module, and in different orders, and by different components/modules, yet still achieve the functions of the visual testing server 104 and manager 222.

In addition, programming interfaces to the data stored as part of the visual testing server 104 and manager 222, can be available by standard mechanisms such as through C, C++, C #, and Java APIs; libraries for accessing files, databases, or other data repositories; scripting languages such as XML; or Web servers, FTP servers, NFS file servers, or other types of servers providing access to stored data. The testing data storage 216 and data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the visual testing manager 222.

Furthermore, in some embodiments, some or all of the components of the visual testing server 104 and manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

Figure 3:
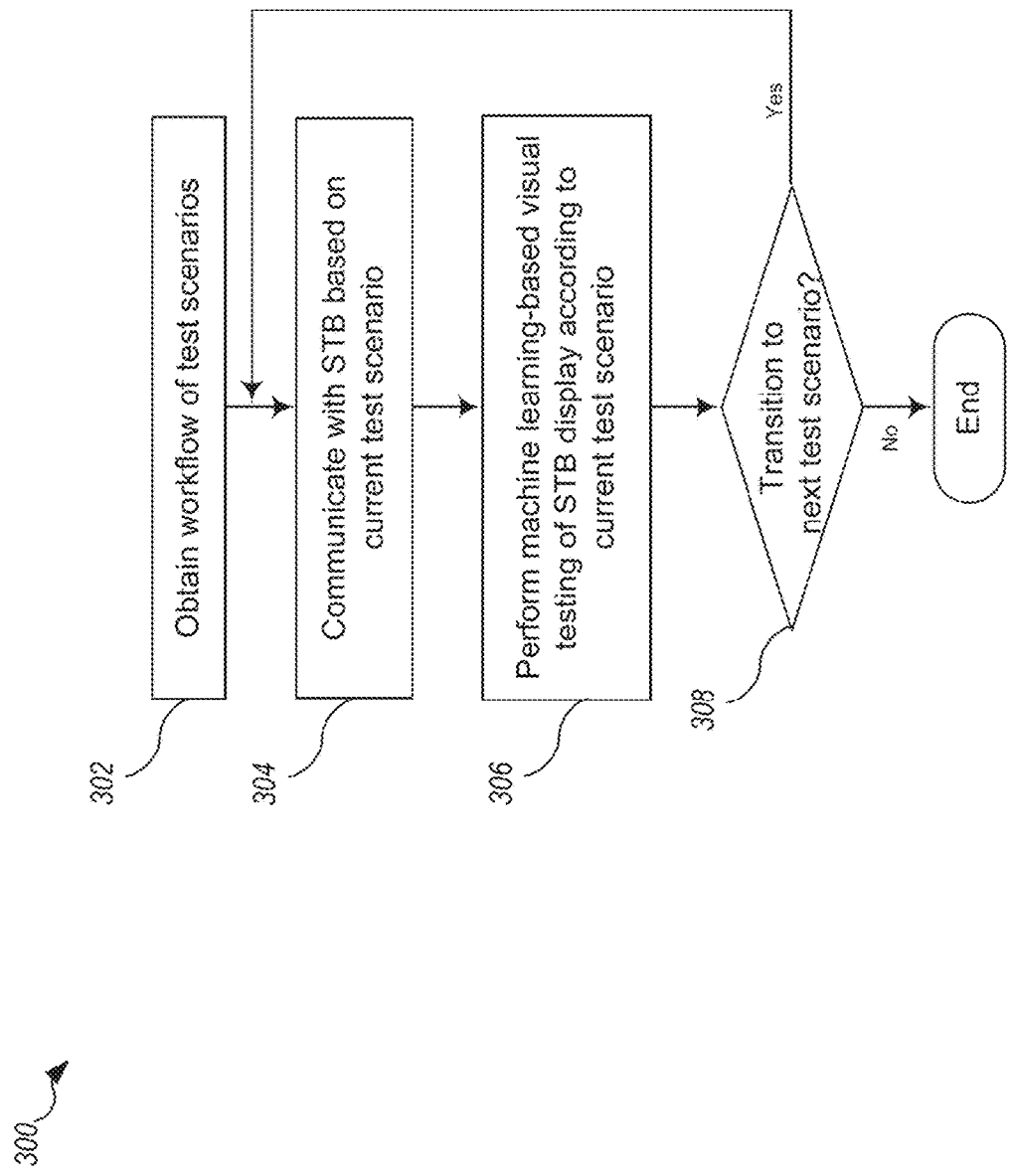
FIG. 3 is a flow diagram depicting an exemplary visual testing process performed in accordance with some embodiments of the techniques described herein.

FIG. 3 is a flow diagram showing an exemplary process 300 for visual testing, according to some embodiments. Illustratively, the process 300 is performed by the visual testing server 104. In some embodiments, part of the process 300 is performed by STB device(s) 118 and/or user device(s) 138.

The process 300 begins at block 302, which includes obtaining a workflow of test scenarios for visual testing of one or more target displays controlled or otherwise associated with STB device(s). For example, the content (e.g., dashboard, menu, playback control, etc.) displayed on the one or more target displays is controlled, at least partially, by an associated STB device executing a program or application that's native to the STB device or developed by a third party.

In some embodiments, the workflow of test scenarios is obtained in a manner independent from the program or application currently executing on the STB device(s). For example, the workflow of test scenarios abides by black box testing principles and is manually or automatically generated without knowledge of the computer-executable code or instructions currently running on the STB device(s).

In some embodiments, each test scenario defines or otherwise indicates one or more conditions, actions, and expectations for the visual testing. Depending on the implementation, individual test scenarios can take the form of statement(s) that conforms to a defined grammar, a free-text description, a graph-based illustration, combinations of the same or the like.

FIG. 4A shows an example of a test scenario in the form of a statement that conforms to a defined grammar. As illustrated in FIG. 4A, a condition that should be satisfied for executing the test scenario is specified by structured text that follows a defined keyword "Given," an action to be taken when executing the test scenario is specified by structured text that follows another defined keyword "When," and a list of expectations of visual display responsive to the action is specified by structured text that follows yet another defined keyword "Then." In various embodiments, the expectations can indicate a location of a display element relative to at least another display element, a location of a display element relative to the one or more display, a range of display element location, or a distance between at least two display elements. The expectations can indicate a size of a display element relative to at least another display element, a size of a display element relative to the one or more display, or a range of display element size. Similarly, the expectations can indicate visual criteria related to color, graph, text, or any visual property associated with displayed content.

Referring back to FIG. 3, in some embodiments, obtaining a workflow of test scenarios includes generating, processing, or otherwise utilizing GUI(s). In some embodiments, the GUI(s) can be generated by the visual testing server 104 and displayed via user device(s) 138, where user(s) (e.g., testers, developers, third party operators, or the like) can input one or more test scenarios.

Figure 4B:
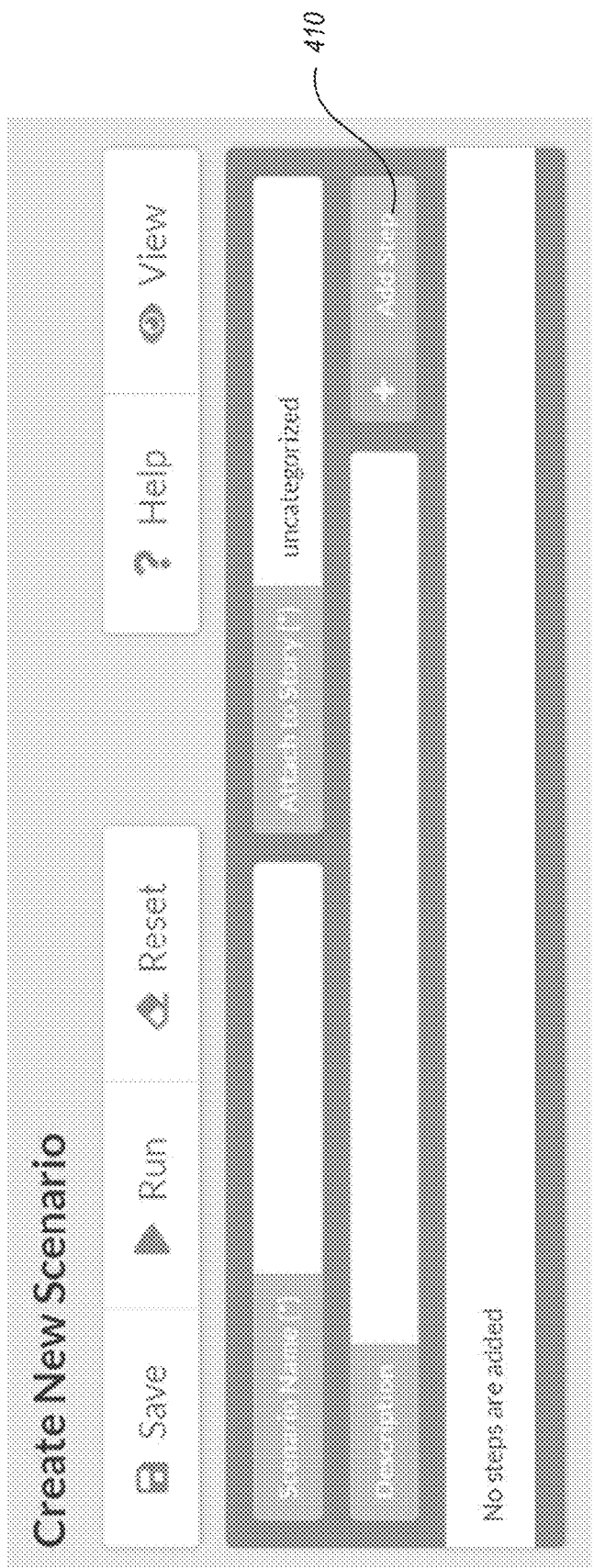
FIG. 4B shows an example of a graphical user interface (GUI) for obtaining a workflow of test scenarios in accordance with some embodiments of the techniques described herein.

FIG. 4B shows an example of a GUI for obtaining a workflow of test scenarios. As illustrated, the GUI includes one or more dropdown menus 410 where a user can select from defined keywords (e.g., corresponding to those described with respect to FIG. 4A) with auto-populated structure enabling the user to fill in, select, or otherwise input information that follows the selected keyword. In other words, the GUI automatically enforces grammar defined for test scenarios, which allows a user to avoid grammatical errors and focus on inputting the logic and substance of test scenarios.

Referring back to FIG. 3, in some embodiments, the test scenarios are connected to one another to form the test workflow. Temporally, a test scenario can be subsequent, concurrent, or partially overlapping with another. Logically, a test scenario may or may not be executed depending on the result of another test scenario in the workflow. In some embodiments, the workflow is represented as a directed graph of test scenarios that are connected with one another.

At block 304, the process 300 includes communicating with the STB device(s) based on a current test scenario retrieved from the workflow. In some embodiments, the currently test scenario is selected, parsed, and/or analyzed to provide condition(s) to evaluate for executing the test scenarios, action(s) to take or simulate for the testing, and/or expectation(s) of displayed content for visual verification. Illustratively, the communication with the STB device(s) is based at least partially on one or more actions specified by the current test scenario. For example, the action(s) can specify a remote control key press, menu selection, mouse click, keyboard keystroke, screen touch, idling for certain amount of time, or the like. The visual testing server 104 can communicate with an associated server or application executing on the STB device(s) to perform or simulate the action(s). In some embodiments, the visual testing server 104 communicates or otherwise causes other device(s) (e.g., a remote control of the STB device(s), a smartphone in wireless connection with the STB device(s), a personal computer, or the like) to perform or simulate the action(s).

At block 306, the process 300 includes performing machine learning-based visual testing of the STB device(s) according to the current test scenario. In some embodiments, the visual testing server 104 obtains one or more images or videos that capture content displayed on the one or more target displays that is responsive to the communication with the STB device(s) (or responsive to the action(s) otherwise performed or simulated). In some embodiments, the visual testing server 104 receives the image(s) or video(s) from an associated server or application executing on the STB device(s). In some embodiments, the visual testing server 104 can receive or otherwise access such image(s) or video(s) via other device(s), such as camera(s) that capture or monitor the content presented on the target display(s).

In some embodiments, the visual testing server 104 feeds the image(s) or video(s) to trained machine learning model(s) to detect (e.g., identify, locate, and/or quantify) a set of display elements. The machine learning model(s) can include one or more convolutional neural networks, support vector machines, hierarchical statistical models, combinations of the same of the like. The machine learning model(s) can be trained on previous image(s) or video(s) that capture content presented on the target display(s). Alternatively or in addition, the machine learning model(s) can be trained on previous image(s) or video(s) that capture content presented on other display(s) controlled or associated with other STB device(s). In some embodiments, individual images or videos of the training data include one or more tagged or labeled display elements. Collectively they make up a master collection of display elements that the trained machine learning model(s) have learned to detect in new image(s) or video(s).

Depending on the training and output format of the machine learning model(s), the visual testing server 104 obtains a classification, location, size, color, and/or content of individual display elements as detected. In some embodiments, the visual testing server 104 also obtains confidence value(s) (e.g., a percentage) associated with the detection of individual display elements. In some embodiments, the display element detection is performed in combination with other pattern recognition or feature detection methods (e.g., optical character recognition).

The visual testing server 104 then performs visual testing based at least partially on the detected display elements in accordance with the current test scenario, e.g., to perform verification according to the expectation(s) specified by the current test scenario. Using the obtained properties and information regarding the detected display elements, the visual testing server 104 can perform relevant computations and compare the content displayed on the target display(s) with the expectation(s). In some embodiments, the comparison can result in a "pass" or "fail" outcome of the current test scenario. In some embodiments, the test outcome can be undermined or need further investigation. For example, if the confidence value(s) associated with one or more detected display elements are below a threshold, then a user can be notified to intervene in the visual testing process. The user can then confirm whether the detected display element(s) exists, and feedback the confirmation to the visual testing server 104, for example, via a user interface presented on an associated user device. In some embodiments, the user feedback data is saved and when it reaches a certain threshold (e.g., a certain threshold number of confirmed and/or unconfirmed display elements), the machine learning model(s) will be retrained using at least part of the user feedback data. For example, the most dated portion of the training data will be removed, and the user feedback data will be added to the training data for model retraining.

Figure 4C:
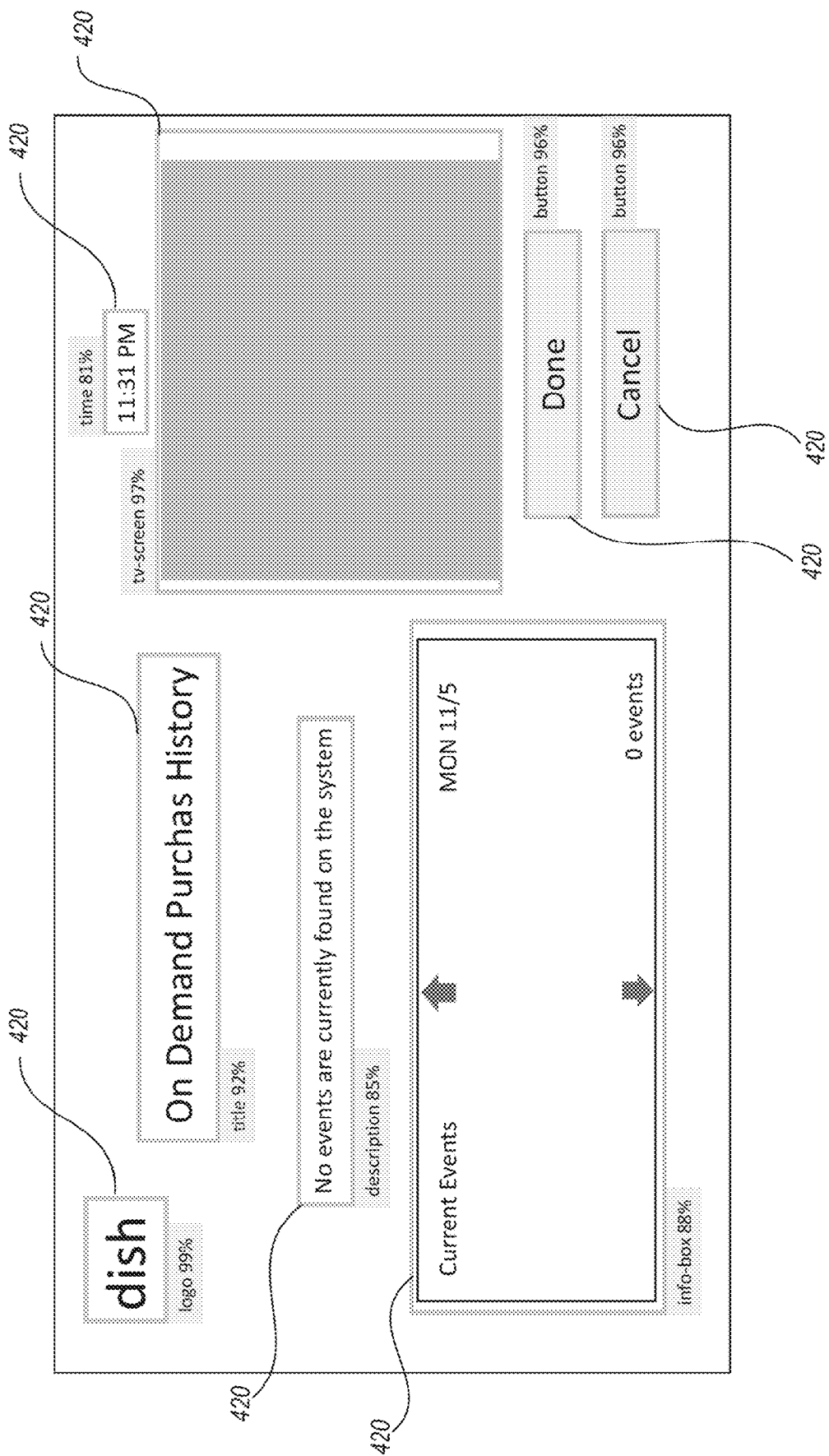
FIG. 4C shows an example of a GUI presenting progress of visual testing in accordance with the testing scenario of FIG. 4A.

In some embodiments, the progress or result of the visual testing can be presented to user(s). Similar to obtaining a workflow of test scenarios, GUI(s) can be generated, processed, or otherwise utilized. In some embodiments, the GUI(s) can be generated by the visual testing server 104 and displayed via user device(s) 138, where user(s) monitor, intervene, or control the visual testing. FIG. 4C shows an example of a GUI presenting progress of visual testing in accordance with the testing scenario of FIG. 4A. As illustrated, the GUI includes one or more bounding boxes 420 (with associated classification labels and confidence values) that highlight detected display items.

Referring back to FIG. 3, at block 308, the process 300 includes determining whether to transition to a next test scenario of the workflow. The determination can be based on the outcome of the current test scenario, the temporal or logical relationship between the current and next test scenarios, user intervention or override, combination of the same or the like. If the process 300 is to transition to the next test scenario, it returns to block 302 to proceed with the next test scenario. Otherwise, the process 300 ends.

Those skilled in the art will appreciate that the various operations depicted via FIG. 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for visual testing of programmed display of content, the method comprising:
obtaining a workflow of visual test scenarios for visual testing of one or more displays, wherein content displayed on the one or more displays is controlled, at least partially, by one or more set-top box (STB) devices executing target instructions, wherein the workflow corresponds to a directed graph of visual test scenarios, each to cause display of content via the one or more displays, that are connected to one another and at least two of the visual test scenarios are temporally partially overlapping;
communicating with the one or more STB devices based at least partially on one or more actions specified by a first visual test scenario in the workflow;
responsive to the communicating, identifying a first set of display elements from content displayed on the one or more displays; and
performing first visual testing based at least partially on the first set of display elements in accordance with one or more visual expectations specified by the first visual test scenario.

2. The method of claim 1, wherein the workflow of visual test scenarios is generated independently from the target instructions.

3. The method of claim 1, wherein identifying the first set of display elements comprises determining at least one of a classification, location, size, color, or content of individual display elements of the first set of display elements.

4. The method of claim 1, wherein a trained machine learning model is used to determine the at least one of a classification, location, size, color, or content of individual display elements.

5. The method of claim 1, wherein the one or more visual expectations indicate at least one of a location of a display element relative to at least another display element, a location of a display element relative to the one or more displays, a range of display element location, or a distance between at least two display elements.

6. The method of claim 1, wherein the one or more visual expectations indicate at least one of a size of a display element relative to at least another display element, a size of a display element relative to the one or more displays, or a range of display element size.

7. The method of claim 1, further comprising obtaining one or more confidence values associated with individual display elements of the first set of display elements based at least partially on a trained machine learning model.

8. The method of claim 7, further comprising determining an outcome of the first visual testing based at least partially on the one or more confidence values.

9. The method of claim 1, further comprising:
communicating with the one or more STB devices based at least partially on one or more actions specified by a second visual test scenario in the workflow;
responsive to the communicating, identifying a second set of display elements from content displayed on the one or more displays; and
performing second visual testing based at least partially on the second set of display elements in accordance with one or more visual expectations specified by the second visual test scenario.

10. One or more non-transitory computer-readable media collectively having contents configured to cause one or more processors to perform actions comprising:
obtaining a workflow of visual test scenarios for visual testing of one or more displays, wherein content displayed on the one or more displays is controlled, at least partially, by one or more set-top box (STB) devices, wherein the workflow corresponds to a directed graph of visual test scenarios, each to cause display of content via the one or more displays, that are connected to one another and at least two of the visual test scenarios are temporally partially overlapping;
communicating with the one or more STB devices based at least partially on one or more actions specified by a first visual test scenario in the workflow;
responsive to the communicating, identifying a first set of display elements from content displayed on the one or more displays; and
performing first visual testing based at least partially on the first set of display elements in accordance with one or more visual expectations specified by the first visual test scenario.

11. The non-transitory computer-readable media of claim 10, wherein the actions further comprise:
communicating with the one or more STB devices based at least partially on one or more actions specified by a second visual test scenario in the workflow;

responsive to the communicating, identifying a second set of display elements from content displayed on the one or more displays; and performing second visual testing based at least partially on the second set of display elements in accordance with one or more visual expectations specified by the second visual test scenario.

12. The non-transitory computer-readable media of claim 11, wherein the first visual test scenario and the second visual test scenario are temporally sequential, concurrent, or partially overlapping with one another.

13. The non-transitory computer-readable media of claim 11, wherein the communicating with the one or more STB devices based at least partially on one or more actions specified by a second visual test scenario in the workflow is responsive to a successful outcome of the first visual testing.

14. The non-transitory computer-readable media of claim 10, wherein the identifying a first set of display elements is based on a machine learning model that was trained on content displayed on one or more displays controlled, at least partially, by another STB device.

15. The non-transitory computer-readable media of claim 10, wherein identifying the first set of display elements comprises determining at least one of a classification, location, size, color, or content of individual display elements of the first set of display elements.

16. The non-transitory computer-readable media of claim 10, wherein the actions further comprise obtaining one or more confidence values associated with individual display elements of the first set of display elements based at least partially on a trained machine learning model.

17. A system, comprising:
one or more processors; and
memory storing contents that, when executed by the one or more processors, cause the system to:
obtain a workflow of visual test scenarios for visual testing of one or more displays, wherein content displayed on the one or more displays is controlled, at least partially, by one or more set-top box (STB) devices, wherein the workflow corresponds to a directed graph of test scenarios, each to cause display of content via the one or more displays, that are connected to one another and at least two of the test scenarios are temporally partially overlapping;
communicate with the one or more STB devices based at least partially on one or more actions specified by a visual test scenario selected from the workflow;
responsive to the communicating, identifying a set of display elements from content displayed on the one or more displays; and
perform visual testing based at least partially on the set of display elements in accordance with one or more visual expectations specified by the visual test scenario.

18. The system of claim 17, wherein the contents further cause the system to obtain the workflow of visual test scenarios at least partially via a graphical user interface.

19. The system of claim 17, wherein the one or more visual expectations indicate at least one of a location of a display element relative to at least another display element, a location of a display element relative to the one or more display, a range of display element location, or a distance between at least two display elements.

20. The system of claim 17, wherein the one or more visual expectations indicate at least one of a size of a display element relative to at least another display element, a size of a display element relative to the one or more display, or a range of display element size.

* * * * *